(12) United States Patent
Vandeberg et al.

(10) Patent No.: US 6,246,824 B1
(45) Date of Patent: *Jun. 12, 2001

(54) METHOD FOR CURING OPTICAL GLASS FIBER COATINGS AND INKS BY LOW POWER ELECTRON BEAM RADIATION

(75) Inventors: John T. Vandeberg, Barrington; Vadim V. Krongauz, Barlett, both of IL (US)

(73) Assignee: DSM N.V., Heerlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,336

(22) Filed: Mar. 18, 1998

Related U.S. Application Data

(60) Provisional application No. 60/041,132, filed on Mar. 18, 1997.

(51) Int. Cl.[7] ............................................. G02B 6/10
(52) U.S. Cl. ........................... 385/129; 385/147; 385/141
(58) Field of Search .................................. 385/123, 129, 385/128, 141, 147; 427/162, 163.2

(56) References Cited

U.S. PATENT DOCUMENTS

| | | | |
|---|---|---|---|
| Re. 33,677 | 8/1991 | Vazirani | 385/123 |
| 4,099,837 | 7/1978 | Vazirani | 385/141 |
| 4,581,407 | 4/1986 | Schmid | 524/548 |
| 4,900,126 | 2/1990 | Jackson et al. | 385/114 |
| 4,910,435 | 3/1990 | Wakalopulos . | |
| 4,953,945 | 9/1990 | Nishimura et al. | 385/114 |
| 5,104,433 | 4/1992 | Chapin et al. | 65/432 |
| 5,212,636 | 6/1993 | Danilychev et al. . | |
| 5,292,459 | 3/1994 | Gelissen et al. | 264/477 |
| 5,336,563 | 8/1994 | Coady et al. | 428/375 |
| 5,414,267 | 5/1995 | Wakalopulos | 250/492.3 |
| 5,456,984 | 10/1995 | Bishop et al. | 428/373 |
| 5,459,175 | * 10/1995 | Woods et al. | 522/180 |
| 5,698,746 | 12/1997 | Lambert | 568/618 |
| 5,837,750 | * 11/1998 | Szum et al. | 522/81 |
| 5,907,023 | * 5/1999 | Chawla | 528/49 |
| 6,014,488 | * 1/2000 | Shustack | 385/128 |
| 6,107,361 | * 8/2000 | Tortorello et al. | 522/96 |

FOREIGN PATENT DOCUMENTS

| | | |
|---|---|---|
| 0145378 | 6/1985 | (EP) . |
| 0614099 A2 | 7/1994 | (EP) . |
| 0 745 570 A2 | 12/1996 | (EP) . |
| 0 874 012 A1 | 10/1998 | (EP) . |
| 59/045944 | 3/1984 | (JP) . |
| 59-045944 | * 3/1984 | (JP) . |
| 05-156054 | 6/1993 | (JP) . |
| 63-168440 | 7/1998 | (JP) . |
| 96/18683 | 5/1995 | (WO) . |
| WO 98/41484 | 9/1998 | (WO) . |

OTHER PUBLICATIONS

Hacker, "New reactions of Cationic Photoinitiators", Radiation Curing In Polymer Science And Technology—vol. II; Photoinitiating Sytems, 473–504, (1993).
Jozwiak, H., "Electron beam curing of laquer coating", Polim. Tworz. Wielk., Aug.1985, pp. 316–319.
Ikada, Y., "Comparison of surface modification of polymers by different methods", Radiation Physics and Chemistry, Jun. 1992, pp. 509–511.
Ando, M., "Synthesis of polymer materials by low energy electron beam", Polymer, Nov. 1988, pp. 2136–2140.
Nho, Y. C., "Radiation–induced graft polymerisation of vinyl benzyltrimethylalmmonium chloride on to polyethylene film", J. Appl. Polym. Sci., Feb. 1994, pp. 1269–1275.
Randy, B. "Surface modification of polyproplyene fibers by photoinitiated grafting", Polymer Preprints, Division of Polymer Chemistry, ACS Vol. 31, 1990, pp.446–447.
Siperko, L. M., "Chemical and physical modification of fluoropolymer surfaces for adhesion enhancement: a review", J. Adhes. Sci. Technol., 1989, pp. 157–173.
Seto, J., "Electron beam curing of acrylic oligomers", Kobunshi Ronbun, 1983, pp. 9–15.
Davidson, R. S. "Electron beam curing of dialkyltin diacrylates", Polymer, 1992, pp.1836–1842.
No Author, "Electron beam curing system", Plast. Engng., Sep. 1987, p. 64.
No Author, "Electron beam curing", Rubber World, Dec. 1987, p. 49.
Vroomen, G. L. M., "Electron beam curing of EPDM", Rubber World, Nov. 1991, pp. 23–32.
Johnson, M. A. "Effects of electron beam dosage on cured homopolymer properties of acrrylate oligomers"RadTech '90 –North America Conference Papers, 1990, pp. 71–79.
Delaney, W. H., "The versatility of electron beam contract processing: releases, PSA, cross–linking, grafting and cationic curing", RadTech '90 –America Conference Papers, 1990, pp. 103–108.
Allen, N. S. "Photooxidative stability of electron beam and UV–cured acrylated epoxy and urethane acrylate resin films", Polym. Degradat. Stabil., 1987, pp. 147–160.
No Author, "Electron beam curing system", Adhesives Age, Mar. 1993, p. 22.
Weiss, D. E., "Electron beam modification of polymer properties", RadTech '92 –North America Conference Papers, 1992, pp. 687–696.
Wybourne, M. N. "Modification of polymer surfaces and the fabrication of submicron–scale functionalized structures by deep–ultraviolet and electron–beam lighography", J. Vac. Sci. Technol., 1993, pp.2210–2213.
Hacker, N.P., "New reactions of cationic photoinitiators", Radiation Curing in Polymer Science and Technology –Vol. 2: Photoinitiating Systems, 1993, pp. 473–504.

* cited by examiner

*Primary Examiner*—Hung N. Ngo
(74) *Attorney, Agent, or Firm*—Pillsbury Winthrop LLP

(57) ABSTRACT

The present invention relates to optical fiber coatings, inks and matrix material structures such as bundles or ribbons, and methods of curing the same, using low power electron beam radiation. The optical fiber substrate is not substantially degraded following exposure to the low power electron beam radiation during the curing process.

17 Claims, No Drawings

METHOD FOR CURING OPTICAL GLASS FIBER COATINGS AND INKS BY LOW POWER ELECTRON BEAM RADIATION

This application claims the benefit of U.S. Provisional No. 60/041,132 filed Mar. 18, 1997.

BACKGROUND OF THE INVENTION

1. Field of the Invention

The present invention relates to a method for curing optical glass or thermoplastic fiber coatings and inks, and in particular, for curing pigmented coatings and inks using low power electron beam radiation.

2. Background Information

Glass or thermoplastic optical fibers are normally coated with an inner primary coating (or "primary coating") and an outer primary coating (or "secondary coating") to protect the properties of the fiber. Coated fiber can be further coated with ink layers to aid in fiber identification. Alternatively, the outer primary coating can be colored to aid in fiber identification. Additional radiation-curable coating compositions, referred to as matrix materials, can be applied to a group of coated optical fibers and then cured to form a protective anchoring structure containing bundles or ribbons of optical fibers. Individual fiber identification can be important when multiple fibers are placed in ribbon or cable structures.

Additional radiation-curable matrix materials can be used to anchor the coated optical fibers in a cable structure containing bundles or ribbons of optical fibers.

Optical fiber coatings, inks and matrix materials are normally cured after application to the fiber. Cure can be achieved by a variety of means including heat (thermal initiation) and light (photoinitiation). However, thermal initiation generally results in slower cure, and fast cure speed is very important in fiber production. Therefore, photoinitiation is generally preferred. In particular, ultraviolet light cure is generally used to achieve rapid cure. It is customary to use a photoinitiator such as an acyl phosphine oxide derivative to increase cure speed.

However, curing of pigmented coating layers such as colored outer primary coatings or inks pose special problems which do not exist for colorless coatings. For example, the presence of pigments limits the ability of light to penetrate the uncured resin and efficiently cure the resin. The effectiveness of photoinitiation can be especially reduced when the resin contains a high pigment density.

Electron beam cure of optical fiber coatings is an alternative to ultraviolet cure and has been disclosed in, for example, U.S. Pat. No. 4,581,407. Electron beam cure can be advantageous because it does not require the presence of photoinitiators which can cause coating discoloration. Both pigmented and unpigmented coatings can be advantageously subjected to electron beam cure. However, electron beam radiation can damage an underlying fiber substrate, in particular, a glass fiber substrate, by ionizing metal atoms in the glass which generates colored centers and increases attenuation of the signal transmitted therein. Electron beams can also damage the resin and adversely affect the coating's mechanical properties. Hence, this method can also have significant disadvantages.

The art has seemingly not yet provided a method of electron beam curing optical fiber coatings, and in particular colored coatings and ink layers, which does not result in damage to the underlying fiber substrate.

SUMMARY OF THE INVENTION

It is an object of this invention to provide a method of electron beam curing optical fiber coatings and inks without substantial fiber damage. It is a further object of the present invention to provide a coated optical glass or thermoplastic fiber which comprises at least one layer which has been cured by electron beam treatment which leaves the underlying fiber substrate substantially unaffected. These objectives are achieved by applying a radiation-curable coating or ink layer to an optical fiber and exposing the layer to electron beam radiation which is produced with an effectively low amount of accelerating voltage to avoid substantial degradation to the glass or thermoplastic optical fiber.

The method of this invention can also be used to cure radiation-curable compositions which are used as matrix materials to form bundles or ribbons of coated optical fibers.

As used herein, the term "low power electron beam radiation" means an electron beam produced with an accelerating voltage (i.e., beam power or energy) of about 125 kV or less. In one embodiment, the energy of the beam is about 80 kV or less. In another embodiment of the invention, the energy is about 60 kV or less.

Preferably, the power of the electron beam is adjusted so that the electrons leave the substrate substantially unaffected. The phrase "avoid substantial degradation" means that the appearance (e.g., color) and material properties of the optical glass or thermoplastic fiber substrate are substantially unchanged. The energy is preferably at least about 10 kV, and more preferably, at least about 20 kV, and more preferably, at least about 30 kV.

DETAILED DESCRIPTION OF THE INVENTION

The method of the present invention provides numerous advantages over prior methods of curing optical glass fiber coatings and inks. Because of the penetrating ability of the electron beam, resins comprising high concentrations of pigments can be effectively cured. If so desired, the method can be practiced without photoinitiators being present in the radiation-curable compositions, thus reducing the cost as well as improving the photooxidative stability of the cured coating. In addition to being less expensive than coatings with initiators, coatings without initiators have less extractables and therefore may be considered for use in direct contact with food in food packaging, or in biomedical applications, such as fiber optic sensors for blood oxygen in vivo.

At the same time, however, because the energy of the beam can be controlled, thin layers of resins or inks can be cured without substantial damage to the underlying substrate. In a further advantage over high-energy methods, the present low energy method can result in lower emission of stray radiation during application of the electron beam.

Furthermore, the method of the invention can be used to cure coatings and inks on optical fibers made of thermosetting polymers. Optical fibers of thermosetting polymers are preferably coated with materials which have a refractive index complementary to the thermosetting core of the fiber, such that minimal loss of light occurs during transmission through the coated fibers. As with glass optical fibers, the curing process preferably does not adversely affect the underlying thermoplastic fibers. Thermoplastic optical fibers are disclosed in, for example, U.S. Pat. No. 5,292,459, the entire contents of which is incorporated herein by reference.

The method can be practiced using electron beams with an energy of less than about 125 kV. The energy of the beam can be adjusted depending on the density of the coating, the thickness of the coating, the desired depth of curing, and other factors. For example, a beam of 50–60 kV is normally sufficient to cure to a depth of about 25 μm.

Although the dosage can be varied according to the need, dosages of up to about 30 Mrads can be used. Dosage of about 2–8 Mrads can be effective.

Typically, production of electron beam radiation requires a power source supply and an electron-beam accelerator (i.e., an electron beam apparatus). Preferably the electron beam apparatus comprises one or more electron beam tubes. An example of such an electron beam array is described in Wakalopulos (U.S. Pat. No. 5,414,267), incorporated herein by reference. Briefly, Wakalopulos describes a system comprising an array of thin low-Z film (e.g., atomic number less than 20) window electron beam tubes mounted on a silicon support plate. Preferably, the window through which the electrons pass is electron permeable and gas impermeable. In a preferred embodiment, the window comprises silicon carbide, silicon nitride, boron nitride or doped silicon. Each beam tube generates a stripe-like electron beam which spans part of the width of material being treated at a relatively low voltage. The remainder of the width is treated with stripe-like beams from other tubes, the arrangement of tubes having beams spanning the entire width of material to be cured. The geometric arrangement of the tubes can be varied widely to accommodate the cylindrical shape of the optical fiber. For example, the tubes may be arrayed at angles (e.g., 120°) from one another to cure coatings and inks on optical fibers in a single pass. Similarly, two or more tubes may be arrayed opposing one another (e.g., 180°) to facilitate the curing of matrix material compositions used to form bundles or ribbons which anchor coated optical fibers.

The apparatus can further contain more than one set of tubes, each set delivering a different dose or intensity of electrons. For example, where it is desirable to reduce inerting, one set of tubes can be set to deliver a high surface dose at a lower voltage to effectively cure the surface of the material. A second set of tubes would be set to deliver a lower dose of higher voltage in order to achieve through cure.

The apparatus can comprise a mechanism for passing the optical fiber beneath the electron beam source in a continuous manner such as a conveyor belt or roller. When curing matrix material coating compositions used to form bundles, ribbons or cables, opposing tubes may be positioned above and below the material being cured. The curing rate is rapid (e.g., less than 1 second), and can be effectively achieved in a single pass. While the distance between the beam and the material may be varied according to need, it has been found that a distance of about 0.1 cm to about 2 cm, measured from the surface of the electron beam tube window to the surface of the coating, is effective.

The method can be applied to coated fibers having multiple coating layers including fibers which comprise an ink layer. The optical fiber coatings may be cured via a wet-on-wet process whereby the inner primary and outer primary coatings are applied wet and cured in one step. Alternatively, the coatings may be cured using a wet-on-dry process whereby the first coat is cured prior to application of the second coat. Optical fiber coatings and processes for coating fiber are disclosed in, for example, U.S. Pat. No. 4,099,837 or its Reissue Pat. No. 33,677 and U.S. Pat. No. 5,104,433, which are hereby incorporated by reference. U.S. Pat. No. 5,336,563 also discloses suitable optical fiber primary coatings which is hereby incorporated by reference. U.S. Pat. No. 5,456,984 discloses matrix material compositions which can be used to form bundles or ribbons suitable for anchoring coated optical fibers, which is hereby incorporated by reference. Fibers also can be sprayed electrostatically and passed beneath the source in an inert atmosphere.

Single or multi-mode fiber can be used.

The coated optical fiber can comprise an outer primary layer (secondary layer) which is tough or hard enough to protect the optical fiber and any underlying coatings. The underlying coatings can be inner primary coatings which are typically softer in comparison to the outer primary layer. These individual layers, including the outer primary layer, can be cured by any methods known in the art, or may be cured using the methods of the present invention.

Coated optical fibers can be bundled together using radiation-curable matrix materials in ribbon structures which typically comprise 2 to 12 fibers. Ribbon structures can be bundled in multiple layers and/or configurations depending upon the ultimate application or use of the bundled fibers. These matrix materials can be cured by any methods known in the art, or may be cured using the methods of the present invention. The coated optical fibers can be colored to differentiate the fibers. To allow for easy access to these individual fibers, the coating composition may comprise a release agent. Suitable release agents include silicones, silicone acrylates, fluoro-carbon oils or resins and the like. Where such agents are used, the optical fiber coatings preferably comprise 0.5–20 wt. % of a suitable release agent.

Although the present methods may be widely applied to a variety of polymer systems, typically the methods of the present invention will be used to cure polymer coatings and inks amenable to cure by UV radiation, but in general, no UV-sensitive photoinitiator is needed. UV curable polymers are those which undergo free-radical or cationic polymerization, generally with aid of a photoinitiator. Electrons act as an external catalyst, and are applied, when needed, to materials responsive to free radical or cationic polymerization, or free radical or ion generation through chemical bond breaking and re-combination within a polymer chain structure, or between polymer chains thereby forming a cross link. Reactions occurring on exposure to electron radiation include initiation reactions; propagation reactions; and termination reactions. In addition, the various types of reactions may result in crosslinking as well as chain scission.

The invention may be used to cure ink coating compositions for coating and identifying optical glass or thermoplastic fibers. Curable ink coatings are usually about 3 to about 10 microns thick, and tend to be concentric to prevent attenuation of signal transmission through the fiber. Such ink coatings typically have a Tg of at least about 30° C., and more preferably at least about 50° C. Compositions for ink coatings can be tailored to optimize desirable properties, often by reformulating compositions initially designed as outer primary coatings, and including desired additives.

Radiation-curable coatings and vehicles for radiation-curable inks are well known in the art, and ingredients are usually selected from acrylate or methacrylate functional oligomers, polyfunctional acrylate monomers, photoinitiators, stabilizers, pigments, and waxes. The oligomers most commonly used are the acrylate and methacrylate derivatives of saturated polyesters, aromatic, aliphatic, and cycloaliphatic epoxy resins, aromatic and aliphatic polyurethanes and polyether polyols. Thiol-ene and thiol-amide systems, wherein polymerization occurs between a group possessing allylic unsaturation and a group containing a tertiary amine or thiol are also suitable. Film properties such as toughness, adhesion, gloss and flexibility may be varied depending on the oligomer(s) used.

The coating and ink compositions may further comprise one or more reactive diluents. Reactive diluents are monofunctional or polyfunctional monomers used primarily to adjust the viscosity of these systems and control cure speed and cross-link density. Monomers or mixtures of monomers having an acrylate or vinyl ether functionality and an $C_4$–$C_{20}$ alkyl or polyether moiety may be used. Compounds having an aromatic group may also be included as reactive diluents. Suitable diluents include pentaerythritol, tri- and tetraacrylate, tripropylene glycol diacrylate, trimethylolpropane triacrylate and their alkoxylated derivatives.

Additional suitable reactive diluents include hexylacrylate, 2-ethylhexylacrylate, isobornylacrylate, decyl-acrylate, laurylacrylate, stearylacrylate, 2-ethoxyethylacrylate, laurylvinylether, 2-ethylhexylvinylether, n-vinyl formamide, isodecyl acrylate, vinyl-caprolactam, isooctylacrylate, n-vinylpyrrolidone, and the like. Diluents with aromatic groups include ethylene glycolphenyletheracrylate, polyethylene glycolphenyl-ether-acrylate, polypropylene glycolphenylether-acrylate and alkyl-substituted phenyl derivatives of these compounds.

If the functional group of the oligomer or monomer comprises a thiol-ene or an amine-ene system, reactive diluents having allylic unsaturation may be used, such as diallylphthalate, triallyltri-mellitate, triallylcyanurate, triallylisocyanurate and diallylisophthalate. For amine-ene systems, amine functional diluents, including adducts of, for example, trimethlolpropane, isophorondiisocyante and di(m)ethylethanolamine, or the adduct of hexanediol, isophorondiisocyanate and dipropylethanolamine may be used.

The present method may be used to cure ink coating compositions without the need of a photoinitiator. Optionally the compositions may comprise one or more photoinitiators, typically present in an amount between about 0.1 and 10 weight percent. Cationic initiators, such as triarylsulfonium salts, alkylarylsulfonium salts, diaryliodonium salts, diarylchloronium and diarylbromonium salts, arylammonium, arylphosphonium and arylarsonium salts and triphenylselenonium salts are suitable. In particular, mixed triarylsulfonium hexafluoroantimonate salts and mixed triarylsulfonium hexafluorophosphate salts are suitable. Examples of free radical-type photoinitiators include hydroxycylohexylphenyl ketone;

hydroxymethylphenylpropanone;

dimethoxyphenylacetophenone; 2-methyl-1-[4-(methyl thio)-phenyl]-2-morpholinopropanone-1; 1-(4-isopropylphenyl)-2-hydroxy-2-methylpropan-1-one; 1-(4-dodecyl-phenyl)-2-hydroxy-2-methylpropan-1-one; 4-(2-hydroxyethoxy)phenyl-2(2-hydroxy-2-propyl)-ketone; diethoxyphenyl acetophenone; 2,4,6 trimethylbenzoyl diphenylphosphone, a mixture of (2,6-dimethoxy benzoyl)-2,4,4 trimethylpentylphosphineoxide and 2-hydroxy-2-methyl-1-phenyl-propane-1-one, and mixtures thereof.

In addition to the acrylate-functional diluents and oligomers used in UV radiation systems, methacrylates, maleics and certain allyl functional oligomers and diluents can be readily copolymerized by electron beam without photoinitiators due to the presence of the energized electrons.

The use of pigments in coatings and inks is well known in the art, as well as methods of their application. Either a colorant is added to the outer primary coating or an ink coating is formed on the outer primary coating of the optical glass fiber to obtain a color-coated optical fiber. Ink compositions and colorants added to the outer primary coatings are now well known in the art. Examples of suitable ink compositions, include, for example, those described in published European application number 0614099A2 and U.S. Pat. Nos. 4,900,126 and 4,953,945, the complete disclosure of which are incorporated herein by reference. The method of the present invention can be used to cure coating and ink compositions which contain any combination of organic and/or inorganic pigments known in the art. Pigments normally do not play a significant role during radiation curing as they are relatively inert towards electron beams. However, they may have an indirect influence as they have a substantial effect on the density of the compound which, in turn, affects the penetration depth of the electron beams. Therefore, the energy of the electron beam may need to be varied according to the properties of the particular pigments used as well as composition density. Also, the composition which is cured by electron beam radiation preferably does not have a thickness which substantially exceeds the mean free path of electrons in the cured media.

Suitable inorganic pigments include, for example, titanium dioxide, zinc oxide, zinc sulfide, barium sulfate, aluminum silicate, calcium silicate, carbon black, black iron oxide, copper chromite black, iron oxides, chromium oxide greens, iron blue, chrome green, violet (e.g., manganese violet, cobalt phosphate, $CoLiPO_4$), lead chromates, lead molybdates; and cadmium, titanate, pearlescent and metallic pigments.

Suitable organic pigments include, for example, monoazo pigments, disazo pigments, disazo condensation pigments, quinacridone pigments, dioxazine violet, vat pigments, perylene pigments, thioindigo pigments, phthalocyanine pigments and tetrachloroisoindoliniones.

The coating and ink composition to be cured may further comprise other materials well known in the polymer art, such as stabilizers, adhesion-promoters, light sensitive and light absorbing components, catalysts, initiators, lubricants, wetting agents, antioxidants, dispersing agents and the like.

The method of the invention may be used to cure matrix-forming coating compositions. Acceptable matrix-forming compositions comprise at least one oligomer or monomer with a reactive functional group capable of undergoing polymerization upon cure. Examples of such functional groups include epoxy groups, thiol-ene or amine-ene systems, and ethylenic unsaturation such as acrylamide, acrylate, methacrylate, vinylether or malate vinylether functionalities. Preferably, the cured matrix material possesses a swell index and Tg that provide for both mid-span access of the coated optical glass fibers using a solvent stripping method, and end-access of the optical glass fibers using a heat stripping method.

The electron-beam curable matrix-forming composition may also contain a reactive diluent having a functional group capable of co-polymerization with the reactive functional group of the oligomer or monomer of the composition. Examples of diluents include acrylate monomers, such as hexanediol diacrylate or propane diol triacrylate.

The matrix-forming composition may further comprise suitable photoinitiators, stabilizers or antiblocking agents.

The swell index of the cured material may be easily determined by measuring the initial volume of the matrix material, immersing the matrix material in a solvent, and measuring the volume of the matrix material after immersion. The swell index is the percent change in volume of the matrix material. Suitable solvents which do not adversely affect the matrix coatings on glass optical fibers include ethanol and/or isopropanol.

A typical composition for an electron-beam curable inner primary or outer primary (secondary) coating for use according to the invention comprises:
- (A) about 10% to about 95% of at least one reactive oligomer;
- (B) about 10% to about 95% of at least one reactive diluent;
- (C) optionally, about 0 to about 10% of at least one photoinitiator; and
- (D) optionally, about 0 to about 10% of at least one additive.

A typical composition for an electron-beam curable matrix material coating for use according to the invention comprises:
- (A) about 10% to about 90% of at least one reactive oligomer;
- (B) about 10% to about 80% of at least one reactive diluent;
- (C) optionally, about 0 to about 10% of at least one photoinitiator; and
- (D) optionally, about 0 to about 10% of at least one additive.

The invention will be further described by the following non-limiting examples.

EXAMPLES

Example I

Ink Sample Preparation and Cure

A white pigmented UV curable ink was prepared by combining 1260 grams clear base resin with 240 grams white pigment mixture followed by filtering with a sintered metal 20 micron mesh filter. The clear base resin was based on a radiation-curable urethane acrylate oligomer prepared from isophorone diisocyanate, 2-hydroxyethyl acrylate, and the polycarbonate polyol (Permanol KM10.1733) with use of phenoxyethyl acrylate (SR 339). The oligomer composition (44.84 wt. %) was mixed with bisphenol-A-ethoxylated diacrylate, SR 349 (48.01 wt. %); ethoxylated nonylphenol acrylate, Aronix M-113 (4.76 wt. %), and Irgacure 184 (2.39 wt. %).

Black pigmented ink was prepared by mixing 1350 grams of the same clear base resin and 150 grams of black pigment mixture.

An electron beam exposure unit was combined with an endless adjustable speed conveyor belt and set for curing of coated films. Samples were 0.5 inches wide and 1 mil (25 microns) thick and were cured on 11 inch long Mylar strips or on glass microscope slides. All of the samples cured after one passage under the electron beam under atmospheric conditions.

Black and white inks were applied to glass microscope slides or Mylar sheets at a thickness of 25 microns. The samples were exposed to 60 kV electron beam radiation (20 Watts, approx. 340 mA) using a EB Raster Scan at 10 feet/min. No discoloration was detected in the underlying substrates. The degree of cure was measured by infrared methods and is provided in Table 1 below. Also, mechanical properties of cured films were measured and are provided in Table 2 below.

Example II

Coating Samples

Two inner primary radiation-curable coatings were prepared, one with photoinitiator and one without (Example II-1-A and Example II-1-B, respectively). Two outer primary radiation-curable coatings were also prepared, one with photoinitiator and one without (Example II-2-A and Example II-2-B, respectively).

The inner primary coating II-1-A was based on urethane acrylate oligomer (about 30–about 60 wt. %, preferably about 50 wt. %) which can be represented by H—I—PPG—I—PC—I—H, wherein H is 2-hydroxyethyl acrylate, I is isophorone diisocyanate, PC is polyhexylcarbonate (MW 900), and PPG is polypropylene glycol (MW 1,000). Diluent was isodecyl acrylate (14 wt. %) and ethoxylatednonylphenol acrylate (about 15 to about 35 wt. %, preferably about 25 wt. %). A photoinitiator system was used comprising 2-hydroxy-2-methyl-1-phenyl-1-propanone (about 0.2 to about 1.0 wt. %, preferably about 0.75 wt. %) and bis(2,6-dimethoxybenzoyl)(2,4,4-trimethylpentyl) phosphine oxide (about 0.5 to about 3.5 wt. %, preferably about 2.25 wt. %). Thermal antioxidant (about 0.1 to about 1.5 wt. %, preferably about 0.5 wt. %) and an optional mercaptopropyl trimethoxysilane adhesion promoter (about 0 to about 5 wt. %, preferably about 1 wt. %) were also present. The primary coating II-1-B included the same ingredients as II-1-A but absent the photoinitiator system.

The outer primary coating II-2-A was based on urethane acrylate oligomer (about 30 to about 60 wt. %, preferably about 35 wt. %) which can be represented by H—T—PTGL—T—H, wherein H is 2-hydroxyethyl acrylate, T is toluene diisocyanate, and PTGL is a polytetramethylene glycol (MW 500–4,00, preferably 1,000). Diluent was ethoxylated bisphenol-A-diacrylate (about 30 to about 60 wt. %, preferably about 50 wt. %) and ethoxylated nonylphenol acrylate (about 4 to about 12 wt. %, preferably about 8 wt. %). A photoinitiator system was used comprising optionally 1-hydroxycyclohexylphenol (about 0 to about 4 wt. %, preferably about 2 wt. %) and optionally diphenyl (2,4,6-trimethylbenzoyl)phosphine oxide (about 0 to about 6 wt. %, preferably about 1 wt. %). An optional thermal antioxidant (about 0 to about 1 wt. %, preferably about 0.5 wt. %) may also present. The outer primary coating II-2-B included the same ingredients as II-2-A but absent the photoinitiator system.

Example III

Degree of Curing

Eight samples were submitted for ATR-IR infrared analysis of the degree of surface cure including the top surface (exposed to beam) and the bottom surface (resting on substrate). The bottom surface of each sample was examined to determine the through-cure effects. Degree of cure is expressed as percent reacted acrylate unsaturation (% RAU) and is shown in Table 1.

TABLE 1

| | Degree of curing | | | |
|---|---|---|---|---|
| | | | % RAU | |
| Coating ID | Description | Substrate | Top | Bottom |
| Example II-1-A | inner primary with photo-initiator | Mylar | 96 | 95 |
| Example II-2-A | outer primary with photo-initiator | Mylar | 69 | 67 |

TABLE 1-continued

Degree of curing

| | | | % RAU | |
|---|---|---|---|---|
| Coating ID | Description | Substrate | Top | Bottom |
| Example II-1-B | inner primary without photo-initiator | Mylar | 97 | 94 |
| Example II-2-B | outer primary without photo-initiator | Mylar | 55 | 72 |
| Example 1 | white ink | Mylar | 34 | 57 |
| Example 1 | black ink | Mylar | 35 | 58 |
| Example II-1-B | inner primary without photo-initiator | glass microscope slide | 98 | 68 |
| Example II-2-B | outer primary without photo-initiator | glass microscope slide | 68 | 65 |

Tensile properties were also determined. The test parameters for determination of tensile properties were: 0.25 inch wide tensile bar specimen using a 2.0 inch gage length with a 1.0 inch/minute strain rate. The modulus of elasticity was calculated using conventional secant determination at 2.5% elongation or least squares determination. The results are presented in Table 2 for each test sample. Example II-1-A was too fragile to test.

TABLE 2

Tensile Measurement

| Sample | Tensile (MPa) | Elongation | Modulus (MPa) |
|---|---|---|---|
| Example 1 (white) | 26 | 4 | 849 |
| | 24 | 5 | 766 |
| | 26 | 12 | 777 |
| | 29 | 5 | 926 |
| | 27 | 5 | 871 |
| | 29 | 8 | 851 |
| | 28 | 5 | 908 |
| Example 1 (black) | 23 | 5 | 753 |
| | 26 | 4 | 871 |
| | 27 | 5 | 893 |
| | 27 | 7 | 824 |
| | 26 | 8 | 777 |
| | 26 | 4 | 818 |
| | 24 | 4 | 803 |
| Example 2 II-2-A | 15 | 5 | 462 |
| | 23 | 11 | 622 |
| | 22 | 7 | 645 |
| | 25 | 13 | 668 |
| | 23 | 12 | 622 |
| | 19 | 11 | 474 |
| | 21 | 6 | 620 |
| Example 2* II-1-B | 0.2 | 8 | 1.6 |
| | 0.8 | 69 | 1.6 |
| | 0.6 | 48 | 1.5 |
| | 0.6 | 48 | 1.9 |
| Example 2 II-2-B | 25 | 11 | 726 |
| | 20 | 3 | 769 |
| | 21 | 3 | 770 |
| | 23 | 13 | 674 |
| | 22 | 4 | 701 |

TABLE 2-continued

Tensile Measurement

| Sample | Tensile (MPa) | Elongation | Modulus (MPa) |
|---|---|---|---|
| | 23 | 7 | 685 |
| | 23 | 6 | 677 |
| | 22 | 4 | 716 |

*Tested coiled up strip

While the invention has been described in detail and with reference to specific embodiments thereof, it will be apparent to those of ordinary skill in the art that various changes and modifications can be made therein without departing from the spirit and scope of thereof.

What we claim is:

1. A coated optical fiber comprising at least one radiation-cured layer and an optical fiber substrate, wherein said at least one radiation-cured layer comprises a pre-cure composition comprising:
    a) about 10% to about 95% of at least one reactive oligomer;
    b) about 10% to about 95% of at least one reactive diluent;
    c) optionally, about 0 to about 10% of at least one photoinitiator; and
    d) optionally, about 0 to about 10% of at least one additive,
    wherein said optical fiber substrate comprises a member of the group consisting of glass and thermoplastics,
    wherein said radiation-cured layer has been cured by exposure to less than about 125 kV of electron beam radiation, and
    wherein said at least one layer comprises a member selected from the group consisting of an inner primary coating, an ink layer and a colored outer primary layer.

2. The coated optical fiber of claim 1, wherein said radiation-cured layer was cured without substantial presence of photoinitiator.

3. The coated optical fiber of claims 1 or 2, wherein said low power electron beam radiation is generated by an apparatus comprising a plurality of electron beam tubes, each tube emitting a stripe-like electron beam through an electron beam permeable, low-Z, gas impermeable window.

4. A coated optical fiber comprising at least one radiation cured matrix material coating composition and an optical fiber substrate,
    wherein said at least one radiation-cured matrix material coating composition has been cured by exposure to electron beam radiation having an energy less than about 125 kV, and effective to substantially cure said at least one radiation-cured matrix material coating composition, but substantially avoid degrading said optical fiber substrate,
    wherein said at least one radiation-cured matrix material coating composition comprises:
    a) about 10% to about 90% of at least one reactive oligomer;
    b) about 10% to about 80% of at least one reactive diluent;
    c) optionally, about 0 to about 10% of at least one photoinitiator;
    d) optionally, about 0 to about 10% of at least one additive, and
    wherein said coated optical fiber comprises a member selected from the group consisting of glass and thermoplastics.

5. A method of curing at least one radiation-curable layer surrounding an optical fiber substrate comprising the steps of:
   a) applying at least one radiation-curable layer surrounding said optical fiber substrate; and
   b) substantially curing said at least one layer with about 125 kV of electron beam radiation,
   wherein the radiation-cured layer comprises a member selected from the group consisting of an inner primary coating, an ink layer and an outer primary layer.

6. The method of claim 5, wherein said electron beam radiation has an energy of less than about 125 kV.

7. The method of claim 6, wherein said energy is less than about 80 kV.

8. The method of claim 7, wherein said energy is less than or equal to about 60 kV.

9. A method of curing multiple radiation-curable layers surrounding an optical fiber substrate comprising the steps of:
   a) applying one of said multiple radiation-curable layers surrounding said optical fiber substrate; and
   b) substantially curing said at least one layer with about 125 kV of electron beam radiation; and
   sequentially repeating said step a) said step b) for each of said multiple radiation-curable layers surrounding said optical glass fiber substrate.

10. A method of curing at least one radiation-curable layer surrounding an optical fiber substrate comprising the steps of:
    a) applying at least one radiation-curable layer surrounding said optical fiber substrate; and
    b) substantially curing said at least one layer with electron beam radiation less than or equal to about 60 kV,
    wherein said layer is substantially cured to a depth of about 25 mm or less.

11. The method of claim 10, wherein the low power electron beam radiation is generated by an apparatus comprising a plurality of electron beam tubes, each tube emitting a strip-like electron through an electron beam permeable, low-Z, gas impermeable window.

12. The method of claim 11, wherein said tubes are arranged in more than one group, each group having different beam energies.

13. The method of claim 11, wherein said tubes are arranged in three groups, each group being arranged at about 120° angles from one another.

14. The method of claim 11, wherein said tubes are arranged in at least two groups, each group being arranged at about 180° angles from another of said groups.

15. The method of claim 11, wherein the apparatus further comprises a means for advancing the optical fiber past said plurality of electron beam tubes.

16. A method of curing radiation-curable matrix material coating compositions on optical fiber substrates, comprising the steps of:
    a) applying at least one radiation-curable matrix material composition to coat said optical fiber substrates; and
    b) substantially curing said at least one radiation-curable matrix material coating composition with about 125 kV or less of electron-beam radiation in a single pass.

17. The method of claim 16, wherein the distance between said electron beam and said at least one matrix material coating composition is about 0.1 cm to about 2 cm, measured from surface of the electron beam window to the surface of said matrix material coating composition.

* * * * *

(12) EX PARTE REEXAMINATION CERTIFICATE (5505th)
United States Patent
Vandeberg et al.

(10) Number: US 6,246,824 C1
(45) Certificate Issued: Sep. 12, 2006

(54) METHOD FOR CURING OPTICAL GLASS FIBER COATINGS AND INKS BY LOW POWER ELECTRON BEAM RADIATION

(75) Inventors: John T. Vandeberg, Barrington, IL (US); Vadim V. Krongauz, Barlett, IL (US)

(73) Assignee: DSM NV, Heerlen (NL)

Reexamination Request:
No. 90/006,296, May 21, 2002

Reexamination Certificate for:
Patent No.: 6,246,824
Issued: Jun. 12, 2001
Appl. No.: 09/040,336
Filed: Mar. 18, 1998

Related U.S. Application Data

(60) Provisional application No. 60/041,132, filed on Mar. 18, 1997.

(51) Int. Cl.
*G02B 6/02* (2006.01)
*G02B 6/18* (2006.01)
*G02B 6/10* (2006.01)

(52) U.S. Cl. .............. 385/128; 385/147; 385/141; 385/127; 385/129; 427/163.2

(58) Field of Classification Search ............ 385/123, 385/126, 127, 128, 129, 141, 147; 427/162, 427/163.2
See application file for complete search history.

(56) References Cited

U.S. PATENT DOCUMENTS 5,414,267 A 5/1995 Wakalopulos

FOREIGN PATENT DOCUMENTS

EP 0 162 471 A2 11/1985
JP 59-45944 3/1984

OTHER PUBLICATIONS

Fletcher, "Low Voltage (120 kV) Electron Beam Processors," *Radtech Asia '93*, Conference Proceedings Nov. 10–13, 1993, Nippon Convention Center, Tokyo, Japan (Sep. 1993).

*Primary Examiner*—Brian M. Healy

(57) ABSTRACT

The present invention relates to optical fiber coatings, inks and matrix material structures such as bundles or ribbons, and methods of curing the same, using low power electron beam radiation. The optical fiber substrate is not substantially degraded following exposure to the low power electron beam radiation during the curing process.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5, 9 and 16–17 is confirmed.

Claims 6 and 11 are cancelled.

Claims 7, 10 and 12–15 are determined to be patentable as amended.

Claim 8, dependent on an amended claim, is determined to be patentable.

New claims 18–29 are determined to be patentable.

7. The method of claim [6] *29*, wherein said energy is less than about 80 kV.

10. A method of curing at least one radiation-curable layer surrounding an optical fiber substrate comprising the steps of:
  a) applying at least one radiation-curable layer surrounding said optical fiber substrate; and
  b) substantially curing said at least one layer with electron beam radiation less than or equal to about 60 kV,
  wherein said layer is substantially cured to a depth of about 25 mm or less, *and*
  *wherein said electron beam radiation is generated by an apparatus comprising a plurality of electron beam tubes, each tube emitting a strip-like electron through an electron beam permeable, low-Z, gas impermeable window, and*
  *wherein*
    *(i) said tubes are arranged in three groups, each group being arranged at about 120° angles from one another; or*
    *(ii) said tubes are arranged in at least two groups, each group being arranged at about 180° angles from another of said at least two groups.*

12. The method of claim [11] *10*, wherein said tubes are arranged in more than one group, each group having different beam energies.

13. The method of claim [11] *10*, wherein said tubes are arranged in three groups, each group being arranged at about 120° angles from one another.

14. The method of claim [11] *10*, wherein said tubes are arranged in at least two groups, each group being arranged at about 180° angles from another of said groups.

15. The method of claim [11] *10*, wherein the apparatus further comprises a means for advancing the optical fiber past said plurality of electron beam tubes.

*18. The coated optical fiber of claim 1, wherein said at least one radiation-cured layer includes an inner primary coating.*

*19. The coated optical fiber of claim 2, wherein said at least one radiation-cured layer includes an inner primary coating.*

*20. The coated optical fiber of claim 1, wherein said at least one radiation-cured layer includes an ink layer.*

*21. The coated optical fiber of claim 20, wherein said ink layer has a thickness of 3–10 μm.*

*22. The coated optical fiber of claim 20, wherein said ink layer has a glass transition temperature of at least about 30° C.*

*23. The coated optical fiber of claim 2, wherein said at least one radiation-cured layer includes an ink layer.*

*24. The coated optical fiber of claim 2, wherein said at least one radiation-cured layer includes a colored outer primary layer.*

*25. The coated optical fiber of claim 3, wherein, upon curing said pre-cure composition to form said at least one radiation-cured layer, the distance between the surface of said pre-cure composition and the surface of said window is about 0.1 cm to about 2.0 cm.*

*26. The coated optical fiber of claim 3, wherein said tubes are arranged in three groups, each group being arranged at about 120° angles from one another.*

*27. The coated optical fiber of claim 3, wherein said tubes are arranged in at least two groups, each group being arranged at about 180° angles from another of said groups.*

*28. The method of claim 5, wherein said electron beam radiation is generated by an apparatus comprising a plurality of electron beam tubes, each tube emitting a strip-like electron through an electron beam permeable, low-Z, gas impermeable window, and wherein the distance between the surface of said radiation-curable layer and the surface of said window is about 0.1 cm to about 2.0 cm.*

*29. A method of curing at least one radiation-curable layer surrounding an optical fiber substrate comprising the steps of:*
  *a) applying at least one radiation-curable layer surrounding said optical fiber substrate; and*
  *b) substantially curing said at least one layer with less than about 125 kV of electron beam radiation,*
  *wherein the radiation-cured layer comprises a member selected from the group consisting of an inner primary coating, an ink layer and an outer primary layer.*

* * * * *